April 24, 1928.

E. F. DONNELLY

RELIEF VALVE

Filed June 11, 1926

Inventor:
Edward F. Donnelly.
by his atty.

Patented Apr. 24, 1928.

1,667,590

UNITED STATES PATENT OFFICE.

EDWARD F. DONNELLY, OF MALDEN, MASSACHUSETTS.

RELIEF VALVE.

Application filed June 11, 1926. Serial No. 115,375.

This invention relates to improvements in relief valves and particularly to a type of safety pressure relief valve employed in connection with hot-water tanks and their distributing systems for relieving excessive pressures therein and thereby preventing a possible collapse of said tanks.

Relief valves at present obtainable are unreliable and often fail to operate in an emergency. There is no definite limit to which they may be set and often, either through accident or design, or by reason of the fact that they may be manipulated by unskilled persons, they become so varied from their original setting that they do not operate at all as a relief valve, but on the other hand, actually constitute a plug and when an emergency occurs they fail to operate and the tank either collapses or explodes, often with disastrous results. Furthermore, the construction of some valves is such that even though they are never manipulated to vary their original setting, if the valve has been neglected over a period of years, when an emergency does occur the valve fails to function at the pressure at which it is set, and in valves provided with rubber, leather or composition washers, deterioration over a period of years causes these valves to leak, and in making repairs, persons unskilled in the construction of the valve, or not familiar with the safe pressure limit of the hot-water tank, in readjusting the valve unknowingly set the same beyond a safe limit.

It is the object, therefore, of this invention to provide a valve of the character set forth and constructed in such a manner that it cannot be adjusted to function beyond a certain predetermined limit, as for example, at 150 pounds pressure.

It is still further an object of the invention to so construct the valve seat and the movable valve member which cooperates therewith that none of the parts exposed to the action of hot water or steam will deteriorate and thereby cause the valve to leak, or cause the original setting at which it is intended that the valve shall operate to become changed in any manner.

The invention consists in a relief valve as set forth in the following specification and particularly as pointed out in the claims thereof.

Referring to the drawings.

Like numerals refer to like parts throughout the several views of the drawings.

Figure 1:
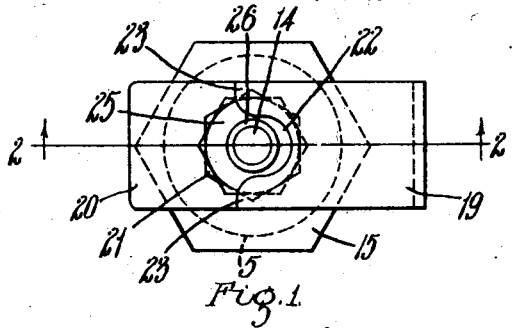
Figure 1 represents a plan view of a relief valve embodying my invention.
Figure 2:
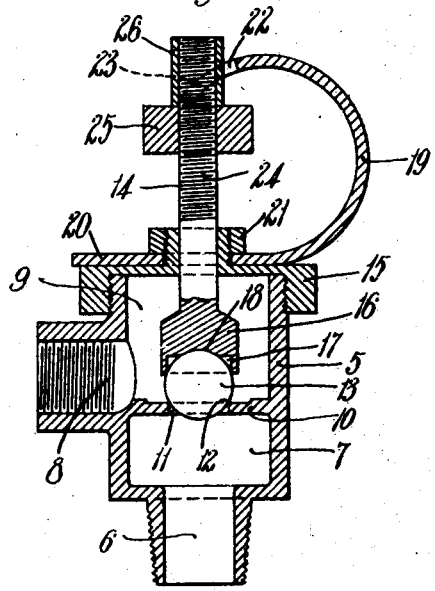
Fig. 2 is a central vertical section taken on the line 2—2 of Figure 1.

In the drawings, 5 represents a valve casing provided with an inlet passage 6, inlet chamber 7, discharge passage 8, discharge chamber 9, and a partition 10 intermediate said inlet and discharge passages and separating said inlet and discharge chambers. The partition 10 is located slightly above the lower side of the discharge passage 8, has an inlet port 11 extending therethrough and connecting the inlet chamber 7 with the discharge chamber 9, and a valve seat 12 is formed at the intersection of the inlet port 11 with said discharge chamber 9.

A spherical valve member 13 is seated upon the valve seat 12 and projects into the inlet port 11, tightly closing said port. The valve member 13 is held firmly against its seat by a valve stem 14 which extends loosely through the top of a cap 15 for the casing 5, said cap having screw-threaded engagement with said casing. The valve stem 14 has an enlarged head 16 formed integral therewith, the lower extremity of which is recessed at 17 to receive the spherical valve member 13, and the central portion of the bottom of said recess is curved to fit the periphery of said spherical member.

The valve member 13 is yieldingly held upon its seat 12 by a spring 19, the latter being provided with a flat base portion 20, which is securely clamped to the cap 15 by a nut 21. The upper portion of the spring 19 is curved and slotted at 22 to form a pair of furcations 23, which extend partly around the upper portion of the valve stem 14, and the upper portion of the latter is screw threaded at 24 to receive an adjusting nut 25 and stop 26, each of which has screw-threaded engagement with said valve stem. The spring 19 may be adjusted to exert any pressure desired, up to a certain predetermined limit, upon the valve member 13, by the adjusting nut 25, the latter engaging the extremity of the furcations 23 and forcing the upper portion of said spring upwardly, and said spring 19 will, therefore, press downwardly on the nut 25 and thus hold the valve member 13 seated with greater or less pressure, depending upon the adjustment of the nut 25. An adjustment of the nut 25 upwardly will cause the spring 19 to act against the stem 14 and valve member 13 with greater pressure, and an adjustment of said nut downwardly will correspondingly relieve the pressure upon said valve member. The valve can thus be adjusted so that it will remain seated until a certain predetermined pressure develops in the hot-water tank, or pipe system, to which the valve may be attached, at which time the valve will open, thus relieving the pressure.

The stop 26 is provided for the purpose of limiting the extent to which the nut 25 may be moved upwardly upon the valve stem 14, thereby making it impossible for any one to set the valve to function above a certain predetermined pressure, and when said stop has been adjusted upon said valve stem to the position desired, said stop is permanently secured to said valve stem, preferably by fusing said parts together, as by brazing or welding, or said parts may be pinned together in such a manner that the pin cannot be removed, if it is so desired.

I claim:

1. A relief valve having, in combination, a casing provided with an inlet passage, an outlet passage and with a valve seat intermediate said passages, a spherical valve member engaging said valve seat, a stem for said valve member extending loosely through said casing, a stop fused at the upper end of said valve stem, a spring secured at one end thereof to said casing, the other end of said spring being curved and terminating adjacent to said stop, and a nut adjustably mounted upon said valve stem and engaging the under side of the upper portion of said spring, said stop limiting the movement of said nut toward said spring.

2. A relief valve having, in combination, a casing provided with an inlet passage, an outlet passage and with a valve seat intermediate said passages, a spherical valve member for said valve seat, a valve stem having a recessed extremity engaging said spherical valve member, said valve stem extending loosely through said casing, a stop having screw-threaded engagement with said valve stem at the upper end thereof and fused thereto, an arcuate spring secured at one end thereof to said casing, the other end of said spring terminating adjacent to said stop, and a nut adjustably mounted upon said valve stem and engaging the under side of the upper portion of said spring, said sleeve limiting the movement of said nut toward said spring.

In testimony whereof I have hereunto set my hand.

EDWARD F. DONNELLY.